UNITED STATES PATENT OFFICE.

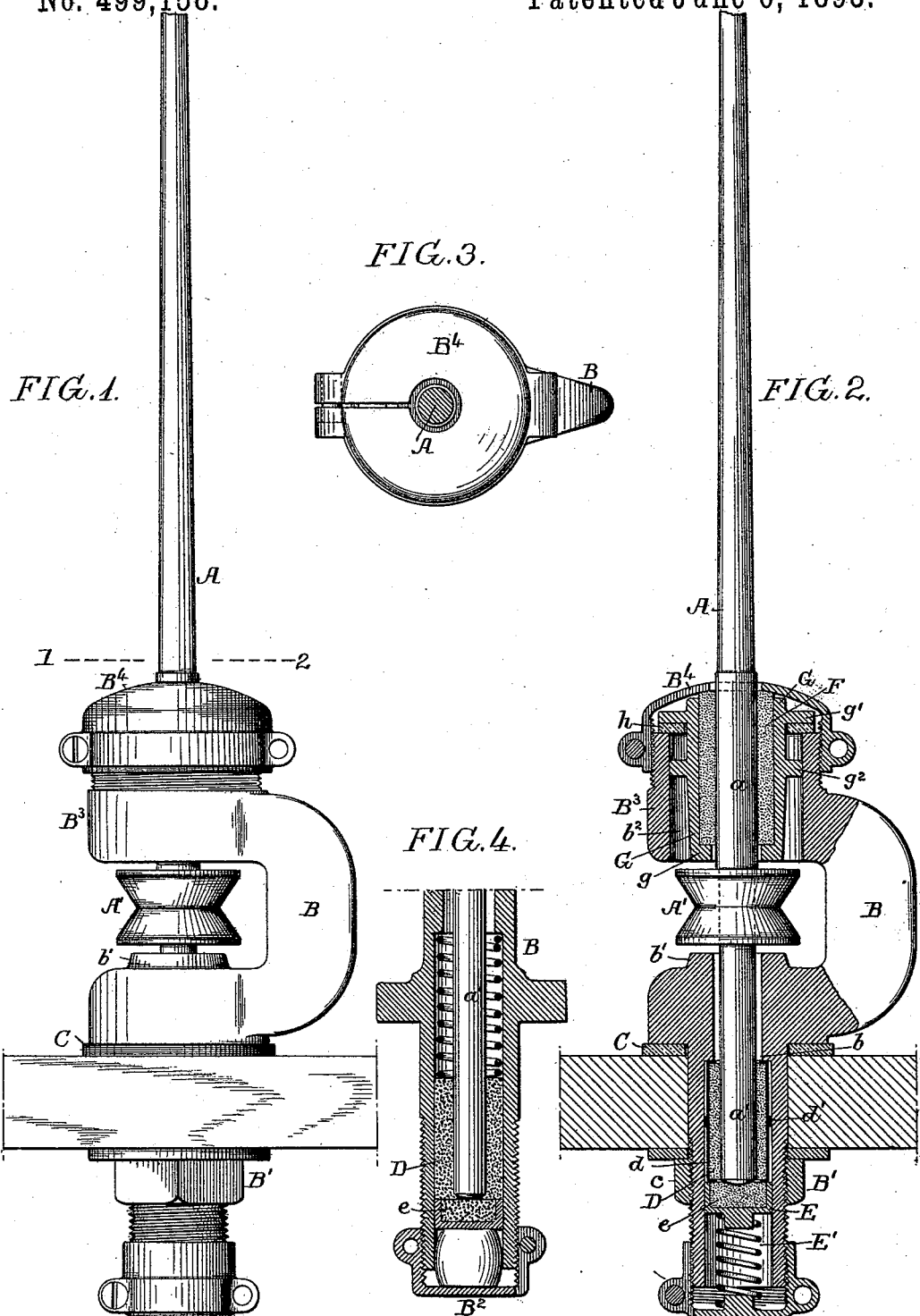

JOHN H. COOPER, OF PHILADELPHIA, PENNSYLVANIA.

SPINDLE-BEARING.

SPECIFICATION forming part of Letters Patent No. 499,158, dated June 6, 1893.

Application filed November 11, 1892. Serial No. 451,643. (No model.)

*To all whom it may concern:*

Be it known that I, JOHN H. COOPER, a citizen of the United States, and a resident of Philadelphia, Pennsylvania, have invented certain Improvements in Spindle-Bearings, of which the following is a specification.

My invention relates to spindle bearings in which self lubricating material, such as plumbago is used for the bearings proper.

The object of my invention is to so mount the said bearings in the support that they will align with the spindle, and at the same time to so construct the device that the bearings will be confined longitudinally so as to prevent them from changing form, from fracturing, and from separating while in use.

My invention further relates to details in the mechanical construction of the bearing.

In the accompanying drawings:—Figure 1, is a side view of a spindle and bearing constructed in accordance with my invention. Fig. 2, is a sectional elevation of the same. Fig. 3, is a sectional plan view on the line 1—2, Fig. 1. Fig. 4, is a sectional view of a modification of my invention.

A is the spindle having a whirl A' and above and below the whirl are the journals $a$ $a'$ mounted in the upper and lower bearings respectively.

B is the bearing support, preferably made in one piece as shown so that after the bearings are once aligned, any adjustment or repairs required to the support will not throw the bearings out of line. The lower portion B' extends through the rail C to which it is secured by a nut $c$ adapted to a screw thread on the portion B', suitable washers being placed between the bearing support and nut and the rail in order that the bearing support will fit snugly to the rail. The upper washer is preferably made of rubber or elastic fiber. The lower portion B' of the support is tubular, and adapted thereto is the lower bearing D preferably made of a self lubricating composition of which plumbago forms an important part. This bearing is solid and homogeneous, having sufficient strength to sustain the ordinary pressures of the spindle. The bearing rests against an upper shoulder $b$ and is held in position against this shoulder by a step support E and spring E', this spring resting against a cap B² screwed upon the threads on the lower portion B' of the bearing support, as clearly shown in Fig. 2, and by adjusting this cap, more or less tension can be given to the spring.

The step support E is preferably in the form of a cap in which is inserted a composition step bearing $e$ made of the same material as the lower bearing D. Upon this step support rests the end of the spindle A. This spindle, as will be noticed in Fig. 2, revolves free of the step support, but when a bobbin or cop is driven on the spindle the thrust is taken by a bank $b'$ against which the whirl strikes, thus relieving the step bearing $e$ from injury by a blow, the spring allowing the spindle to move down freely until the whirl strikes the bank $b'$.

The upper portion B³ of the bearing support is tubular, the opening $b^2$ being of such a diameter as to not only receive the upper bearing F but also to allow for the passage through it of the whirl, so that by simply removing the upper bearing from the support the spindle with the whirl attached can be removed.

The upper bearing F is mounted in a casing G having a lower internal flange $g$ upon which the bearing F rests, and two external flanges $g'$ and $g^2$. The upper flange $g'$ is the supporting flange and rests upon a washer $h$, preferably a flexible washer, the washer bearing upon the upper portion of the support. The flange $g^2$ is situated about half way of the length of the bearing. It snugly fits the opening $b^2$ in the bearing support, and acts as a lateral support and as a swivel for the bearing. Adapted to screw threads on the upper portion $b^2$ of the support is a cap B⁴. This cap overlaps and rests upon the upper portion of the bearing, and not only confines the casing to the support, but also exerts a longitudinal pressure upon the bearing itself, preventing it changing form, fracturing and separating.

The lower bearing D is preferably confined in the case $d$ which, in the present instance, is made tubular, the ends of the case being forced over upon the bearing so as to confine it longitudinally. The case has a central rib or flange $d'$ which bears against the walls of the tubular portion B', the case being slightly less in diameter than the opening, so as to allow the bearing to accommodate itself to its spindle. By these means the upper and lower bearings do not have to be aligned before the insertion of the spindle, but will align themselves with the spindle when the same is placed in position and the parts are so adjusted that the material composing the same will not be liable to fracture as it is not only confined laterally, but also longitudinally.

In Fig. 4 I have shown a spring mounted between the lower bearing and its shoulder and a rubber spring under the step support in place of the spiral spring shown in Fig. 2. The bearing in this instance is shown without a casing, it fitting snugly the tubular lower portion.

The caps $B^2$ and $B^4$ are preferably provided with clamp screws or other devices for holding them in a fixed position and the upper cap $B^4$ is curved to more readily allow the bearing to accommodate itself to the spindle.

I claim as my invention—

1. The combination in a spindle bearing, of the bearing support, the spindle, the composition bearing adapted to the spindle above and below the whirl, casings for said bearings, said bearings and their casings being so mounted in the support as to accommodate themselves to the spindle, substantially as described.

2. In a bearing for spindles, &c., the combination of the bearing support, the spindle, the composition bearing, a case therefor, said case having projections adapted to bear against the walls of the support, with means for confining the casing to the support, and the bearing in the casing, substantially as described.

3. The combination of the spindle, a whirl thereon, with journals on either side of the whirl, a bearing support made in one piece, with upper and lower bearings adapted to the support, the cavity for one of said bearings being of such diameter as to allow for the passage of the whirl, substantially as described.

4. The combination of the spindle, the upper and lower bearings, the support for said bearings, a step bearing mounted below the lower bearing, and a spring for forcing the step bearing against the lower bearing, and forcing the lower bearing to its seat, substantially as described.

5. The combination of the spindle, the support, a bearing therein, a spring mounted between the bearing, and a flange on the support, with a step resting against the bearing and a spring pressing the step, substantially as described.

6. The combination of the spindle, the upper and lower bearings therefor, a support for said bearings, said support having an opening adapted to receive the upper bearing, a casing for said upper bearing, a flange on said casing, a flexible washer between the flange and the support, with a cap for confining the bearing in the casing and the casing on the support, substantially as described.

In testimony whereof I have signed my name to this specification in the presence of two subscribing witnesses.

JOHN H. COOPER.

Witnesses:
HENRY HOWSON,
JOSEPH H. KLEIN.